(12) United States Patent
McFadden

(10) Patent No.: US 7,886,784 B2
(45) Date of Patent: Feb. 15, 2011

(54) MULTI-AXIS COPING APPARATUS

(76) Inventor: Harold E. McFadden, 1708 Bantry Dr., Dresher, PA (US) 19025

( * ) Notice: Subject to any disclaimer, the term of this patent is extended or adjusted under 35 U.S.C. 154(b) by 107 days.

(21) Appl. No.: 12/465,041

(22) Filed: May 13, 2009

(65) Prior Publication Data

US 2010/0288396 A1 Nov. 18, 2010

(51) Int. Cl.
B27C 5/00 (2006.01)
B23C 1/16 (2006.01)

(52) U.S. Cl. .................. 144/144.1; 409/92

(58) Field of Classification Search ........ 144/135.1, 144/135.2, 135.3, 143, 144.1, 154, 2.1, 136.1, 144/242.1; 83/53, 565, 451, 467, 468.93, 83/792, 813, 54, 581, 455, 457, 461, 466.1, 83/468.8, 389, 241; 409/92, 124, 130, 126, 409/125; 408/22, 701

See application file for complete search history.

(56) References Cited

U.S. PATENT DOCUMENTS

| | | | | |
|---|---|---|---|---|
| 3,259,155 | A * | 7/1966 | Kawabata | 83/13 |
| 3,302,669 | A * | 2/1967 | Edler | 83/471.3 |
| 4,249,446 | A | 2/1981 | Tallerico et al. | |
| 4,625,093 | A * | 11/1986 | Chryssolouris | 219/121.69 |
| 4,880,042 | A | 11/1989 | Schafferkotter | |
| 5,094,279 | A | 3/1992 | Dickey et al. | |
| 5,363,732 | A | 11/1994 | Heasley | |
| 5,667,001 | A | 9/1997 | Sanger et al. | |
| 5,778,951 | A | 7/1998 | Huitsing | |
| 5,853,036 | A | 12/1998 | Welch | |
| 6,006,641 | A | 12/1999 | Fletcher | |
| 6,086,462 | A | 7/2000 | Brown | |
| 6,095,726 | A | 8/2000 | Scott et al. | |
| 6,152,009 | A | 11/2000 | Jorgenson et al. | |
| 6,182,373 | B1 | 2/2001 | Veldman | |
| 6,374,879 | B1 * | 4/2002 | Lukehart | 144/134.1 |
| 6,450,220 | B2 | 9/2002 | Domask | |
| 7,143,795 | B1 | 12/2006 | Davis | |
| 7,257,879 | B1 * | 8/2007 | Jancso | 29/566 |
| 7,677,149 | B2 * | 3/2010 | Hogan et al. | 83/451 |
| 2002/0066345 | A1 * | 6/2002 | Shepherd et al. | 83/53 |
| 2006/0112800 | A1 | 6/2006 | Hogan et al. | |
| 2006/0206233 | A1 | 9/2006 | Carpenter et al. | |

* cited by examiner

*Primary Examiner*—Dana Ross
*Assistant Examiner*—Jennifer Chiang
(74) *Attorney, Agent, or Firm*—Michael Crilly, Esq.

(57) ABSTRACT

A coping apparatus facilitating a coped or straight cut through molding by using a stylus to trace the molding being cut to guide the cutter with adjustability for wall-to-ceiling, wall-to-floor, wall-to-wall, and/or backcut angles is presented. The apparatus includes a rotatable holder assembly, a rotatable cutter assembly, a rotatable platform, and a base element. The rotatable holder assembly includes a two-axis positioning system and allows for adjustment to left or right, straight or coped cuts and wall-to-wall angles. The rotatable cutter assembly is attached to the two-axis positioning system and allows adjustment to the left or right, straight, or cope cuts and backcut angle and further includes a motor driven spiral cutter, a cutter holder, and at least one stylus. The rotatable platform allows adjustment to the wall-to-floor or wall-to-wall angle and is movable so as to rotate or swivel about a vertical axis substantially perpendicular to the rotational axis of the holder and cutter assemblies. The base element is attached to and supports the rotatable holder assembly, rotatable cutter assembly, and rotatable platform in a substantially perpendicular arrangement.

16 Claims, 15 Drawing Sheets

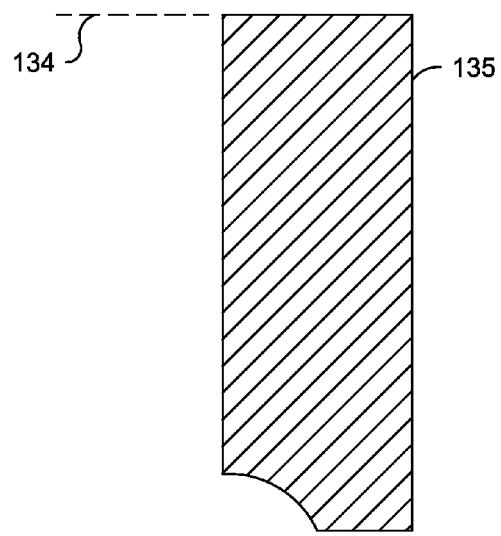
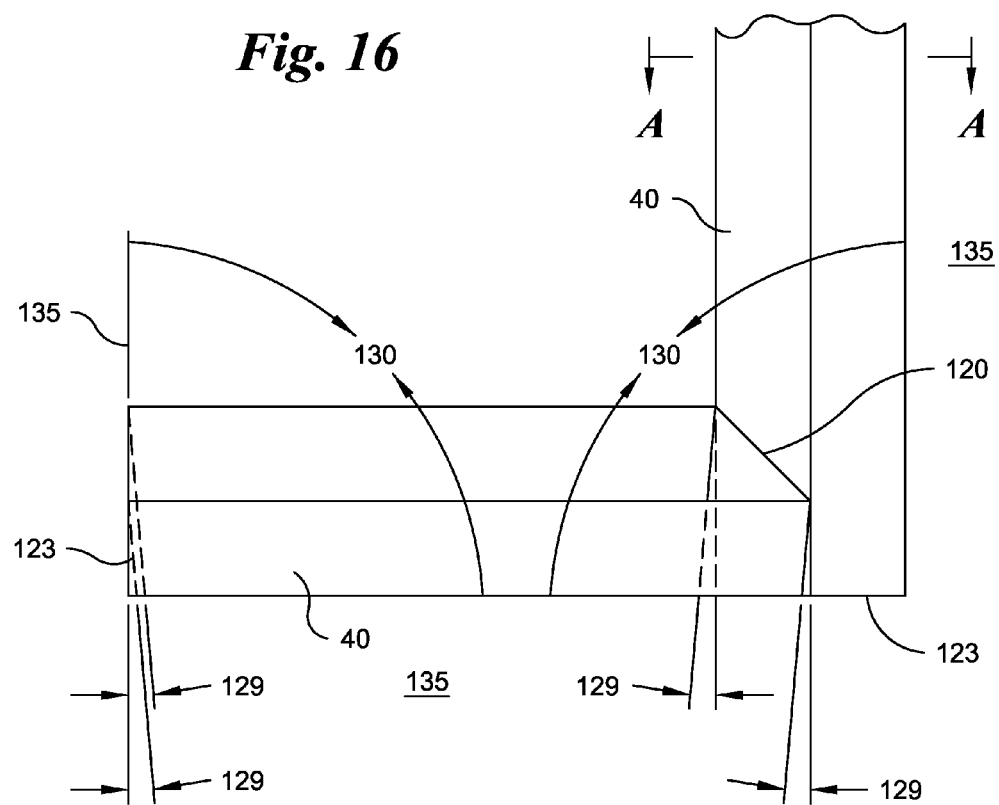
*Fig. 16*

Fig. 17

Cope cutter settings chart

| molding to be mounted against or facing | desciption of cut end | rotatable platform 30 | | | rotatable holder 2 | | rotatable cutter 81 | | surface of table clamp 39 against molding 40 | use stylus | uncut molding 40 extends |
|---|---|---|---|---|---|---|---|---|---|---|---|
| | | scale | index | angle | scale | angle | scale | angle | | | |
| ceiling | right cope 117 | 27 | 35 | wall to ceiling angle 132 | 65 | wall to wall angle 130 | 86 | desired backcut angle | 42 | right 104 | left |
| | left cope 118 | 26 | 34 | | 64 | | 85 | | 41 | left 103 | right |
| | right straight 121 | 27 | 35 | | 67 | | 88 | 0 deg | 42 | right 104 | left |
| | left straight 122 | 26 | 34 | | 66 | | 87 | | 41 | left 103 | right |
| | right molded 125 | 26 | 34 | 90 deg | 64 | 90 deg | 85 | | 41 | right 104 | left |
| | left molded 126 | 27 | 35 | | 65 | | 86 | | 42 | left 103 | right |
| floor | right cope 119 | 26 | 34 | wall to floor angle 131 | 64 | wall to wall angle 130 | 85 | desired backcut angle | 41 | right 104 | left |
| | left cope 120 | 27 | 35 | | 65 | | 86 | | 42 | left 103 | right |
| | right straight 123 | 26 | 34 | | 66 | | 87 | 0 deg | 41 | right 104 | left |
| | left straight 124 | 27 | 35 | | 67 | | 88 | | 42 | left 103 | right |
| | right molded 127 | 27 | 35 | 90 deg | 65 | 90 deg | 86 | | 42 | right 104 | left |
| | left molded 128 | 26 | 34 | | 64 | | 85 | | 41 | left 103 | right |

MULTI-AXIS COPING APPARATUS

CROSS REFERENCE TO RELATED APPLICATIONS

None.

FEDERALLY SPONSORED RESEARCH AND DEVELOPMENT

None.

BACKGROUND OF THE INVENTION

1. Field of the Invention

The invention generally relates to an apparatus capable of cutting the inside corner of architectural molding so that the shape of a cut end is the complement of the molding profile. Specifically, the invention includes a base with a rotatable holder assembly, a rotatable cutter assembly for holding a cutting device, and a rotatable platform arranged in a substantially perpendicular fashion and capable of coping architectural molding with adjustments for backcut angles and/or imperfections associated with wall-to-wall, wall-to-floor, and wall-to-ceiling angles.

2. Background

Mitered inside corner joints are typically fabricated using a miter box or cutoff saw to cut a forty-five degree miter on each mating piece of an inside joint. The quality of such joints is problematic for several reasons. The inside corner between two walls are not always exactly ninety degrees. Fillets or bumps along one or both walls exacerbate the gap between mating pieces. The fastening of a molding to a wall often physically distorts the molding resulting in an unsightly gap at the joint. Caulk and putty are useful in hiding such gaps, but never truly replicate the appearance of precisely coped molding.

A precisely coped inside corner joint is made by cutting a straight end on a first molding and fastening it to a first wall with the straight end abutting a second wall. An end of a second molding is cut so that its shape complements the profile of the first molding. Thereafter, the second molding is fastened to the second wall so that the cut end abuts the profile of the first molding, thereby conforming to the profile thereof. Every professional or weekend carpenter can attest to how difficult and time consuming it is to cut the second molding so that its shape complements the profile of the first molding.

Many coped inside corners are manually cut. It is common practice to cut one end of a molding at a forty-five degree angle to form a guide. The intersection of the forty-five degree cut line and the profile along the molding accurately represents the complement of the molding profile and can be used as a guide for cutting the molding. The cut is made perpendicular to the wall surface or at a backcut angle along the guide line with a coping saw, jig saw, band saw, rotary cutter, router cutter, or circular saw, so as to remove extra material from the portion of molding facing the wall in order to form a tight joint at the visible portion of the joint.

A variety of coping devices are provided in the related arts. Several examples are discussed below to clarify the related arts and distinguish each from the present invention.

Tallerico, Jr., U.S. Pat. No. 4,249,446, describes a coping tracing machine capable of duplicating on the end of a piece of molding, the surface contour of the molding. The device includes an adjustable holding means for a detached piece of molding, a band saw for cutting the molding piece transversely, means for holding a sample of the molding oriented substantially 90° from the piece, tracing means operatively connected to the saw for tracing the surface contour of the sample, and means for moving the tracing means and the saw together in sawing through the piece of molding. Reconfiguration of the device for left and right copes is complicated and time consuming. The detached piece of molding used as a guide is subject to wear and distortion.

Schafferkotter, U.S. Pat. No. 4,880,042, describes a device for cutting a segment of molding for angular mating with a second segment of molding. The device includes a table portion for holding a segment of molding, and a cutter guide portion for guiding a cutting mechanism. The cutter guide portion is mounted on the table portion and comprises a template oriented angularly with respect to the table portion. The template can receive a cutting mechanism extending through an opening in the template such that the cutting mechanism extends angularly with respect to a segment of molding held on the table portion. The opening is shaped such that a segment of molding held on the table portion is cut by tracing the opening with the cutting mechanism. Preparation of the template so that its profile complements the molding profile is difficult and time consuming.

Dickey et al., U.S. Pat. No. 5,094,279, describes a coping jig for making cuts for forming an inside corner for trim boards. The device includes a clamping plate having an integral backing plate along the length of one side and a central opening. Right and left work piece toggle clamps are operably coupled to the underside of the clamping plate on both sides of the opening. A clamping block is secured to the upper side of the clamping plate on each side of the opening. A flat router stage with an opening there through is mounted on the clamping blocks with the opening generally between the blocks. A die clamp is operably coupled to each block for holding a selected pattern between each die clamp and the associated block. The pattern is subject to wear and distortion after multiple cuts, and further, the device will not cut crown molding.

Welch, U.S. Pat. No. 5,853,036, describes a contoured molding cutting apparatus for cutting profiles on the angular end of contoured molding sections. The apparatus includes a manually-guided rotating cutter, a block, and a table allowing for fine, precision, longitudinal and transverse movements of a cutting member to impart angular cuts to the molding section. The cuts result in a profile corresponding to the molding contour enabling the cut work piece to interconnect in a smooth, flush-fitting corner joint. This manual device requires great skill to precisely follow the contour of the surface of the molding, and further, the device will not cut crown molding.

Scott et al., U.S. Pat. No. 6,095,726, describes a coping device including a circular blade, a template having an end provided with a coped profile, a stylus which traces the coped profile of the template and which preferably has substantially the same width and radius of curvature as the blade, clamps for respectively securing the molding and the template in a fixed position, and a base having a stationary portion and a portion movable in two directions relative to the stationary portion. The clamps are coupled to the stationary portion, and the blade and stylus are both coupled to the movable portion. The blade and the stylus are substantially simultaneously movable relative to the clamps so that the molding can be coped with the blade as the stylus traverses the coped profile of the template. The blade and the stylus have the same width, and the stylus is provided with a leading edge having a radiused contour matching the blade. In addition, when coping a crown molding, the blade and the stylus are tiltable to the same angle. Fabrication of the guide molding is difficult and time consuming and the coped edge is subject to wear and distortion after multiple uses. Changing from right to left coped cuts is complicated and time consuming.

Weldman, U.S. Pat. No. 6,182,373, describes an apparatus for cutting baseboard molding to join two adjacent pieces in an inside corner. A plate support is adapted to carry the plate, and is in turn itself carried by a clamping apparatus of known type which typically combines features of a vise and a table. The baseboard molding to be cut is carried adjacent to the plate support within the clamping apparatus. Upper and lower angle boards may be used to support the baseboard molding to be cut at a slight angle from perpendicular to the blade making the cut, in a manner that allows a slight bevel to be made in the cut. A cutting device such as a router is then traced along the patterned cutting edge, thereby cutting off an end of a first piece of baseboard molding in a contour which corresponds to the face of a second piece of baseboard molding. The cut end is therefore adapted for contact with the face of an adjacent piece of baseboard molding oriented at right angles. The cutting device manually follows a template clamped in the device. The template is made by pouring fiberglass resin around a detached piece of molding to form a fiberglass template surface which is the complement of the molding profile. Fabrication of the template is complicated and time consuming, and further, the device will not cut crown molding.

Domask, U.S. Pat. No. 6,450,220, describes a coping jig for guiding a router in cutting the end of a section of decorative trim, preferably for creating an inside corner. The coping jig includes a stationary molding stage that receives a section of molding to be cut. A template platform is mounted above the molding stage by a plurality of resilient mounting members. The resilient mounting members allow the angle of the template platform to change relative to the molding stage. The template platform includes at least one template having a trim pattern formed on an edge surface of the template. The trim pattern is used to guide the router in cutting the molding positioned between the template and the molding stage. Manually coping a molding edge with the described device is difficult and time consuming, and further, the device will not cut crown molding.

Davis, U.S. Pat. No. 7,143,795, describes an apparatus for an attachment for a cut-out tool whereby the cut-out tool is used to cut an identical image of a molding prototype template into a work piece. The attachment is comprised of a base platform having means for mounting the prototype template and means for mounting and securing a work piece thereto. The attachment is further comprised of a movable platform having means for engaging the base platform and capable of linear movement relative to the base platform. Slidably attached to the movable platform is the saw mounting platform capable of transverse linear movement relative to the movable platform with a handle depending therefrom and a saw attachment means mounted thereon. Fabrication of cutting templates is difficult and time consuming.

As is readily apparent from the discussions above, the related arts do not provide a coping apparatus facilitating both precise and quick setup to cope the end of crown, chair rail, and baseboard moldings with proper adjustments for wall-to-wall, wall-to-floor, and wall-to-ceiling, and/or backcut angles.

Therefore, what is required is an apparatus which simplifies fabrication of precisely coped inside corners while facilitating proper adjustments for wall-to-wall, wall-to-floor, wall-to-ceiling, and/or backcut angles.

Furthermore, what is required is an apparatus which facilitates fabrication of precisely coped inside corners while avoiding the use of templates, disassembly of the apparatus, and handling of loose parts.

SUMMARY OF THE INVENTION

An object of the present invention is to provide an apparatus which simplifies fabrication of precisely coped inside corners while facilitating proper adjustments for wall-to-wall, wall-to-floor, and wall-to-ceiling, and/or backcut angles.

A further object of the present invention is to provide an apparatus which facilitates fabrication of precisely coped inside corners by using the molding as a guide while avoiding the use of templates, disassembly of the apparatus, and handling of loose parts.

In accordance with embodiments of the invention, the apparatus includes a rotatable holder assembly with a two-axis positioning system having a likewise rotatable cutter assembly disposed thereon and movable with respect thereto and a rotatable platform. The rotatable holder assembly and platform are attached to a base and disposed in a substantially perpendicular arrangement. A cutting device, examples including, but not limited to, a rotary tool, router, laser, or water jet, is fastened to the cutter assembly. The rotatable holder assembly includes a two-axis positioning system which includes a stationary shaft which is oriented with respect to the platform so as to properly orient the cutting device and direct its movement across the work piece based on the left or right straight or cope cut and the wall-to-wall angle variations from ninety degrees. Two slots in the rotatable holder are parallel to the stationary shaft. For example, the stationary shaft and slots are vertically aligned to achieve a straight cut or oriented at a forty-five degree angle for many coped molding applications. The rotatable cutter assembly is attached to the two-axis positioning system of the rotatable holder and includes mounting hardware for attachment of the cutting device thereto and a stylus to trace the profile of the molding. As the stylus traces the profile of the molding, movement of the stylus is constrained by the two-axis positioning system so as to direct the cutter to make the desired cut on the molding end. The cutter assembly further includes angular adjustments with respect to the rotatable holder assembly to properly account for left or right straight or cope cuts and a backcut angle. The rotatable platform facilitates angular adjustments with respect to the holder and cutter assemblies to account for wall-to-floor and wall-to-ceiling variations from ninety degrees.

Several advantages are offered by the invention. The invention facilitates a precisely coped inside corner without the need for a guide, such as a template, a separate piece of molding, or a manually coped edge. The stylus properly compensates for dimensional variations along the molding as it traces the profile of the molding and moves the cutting instrument accordingly. The stylus contacts the molding piece which is cut off and discarded, thereby avoiding the wear problems noted for the related arts. The invention facilitates quick and precise angular adjustments required for backcut angles and to compensate for wall-to-wall, wall-to-floor, and wall-to-ceiling angle variations. The invention facilitates angular adjustments to the path of the cutting device. All adjustments can be accomplished while avoiding the disassembly of the apparatus and handling of loose parts. The invention is simple, portable, and easy to use.

BRIEF DESCRIPTION OF THE INVENTION

Additional aspects, features, and advantages of the invention will be understood and will become more readily apparent when the invention is considered in the light of the following description made in conjunction with the accompanying drawings.

FIG. 16 is an enlarged view of a baseboard molding illustrating wall-to-wall and backcut angles.

FIG. 17 is a table illustrating cutter settings via the reference numerals required for a variety of molding cuts with the coping apparatus.

DETAILED DESCRIPTION OF THE INVENTION

Figure 1:
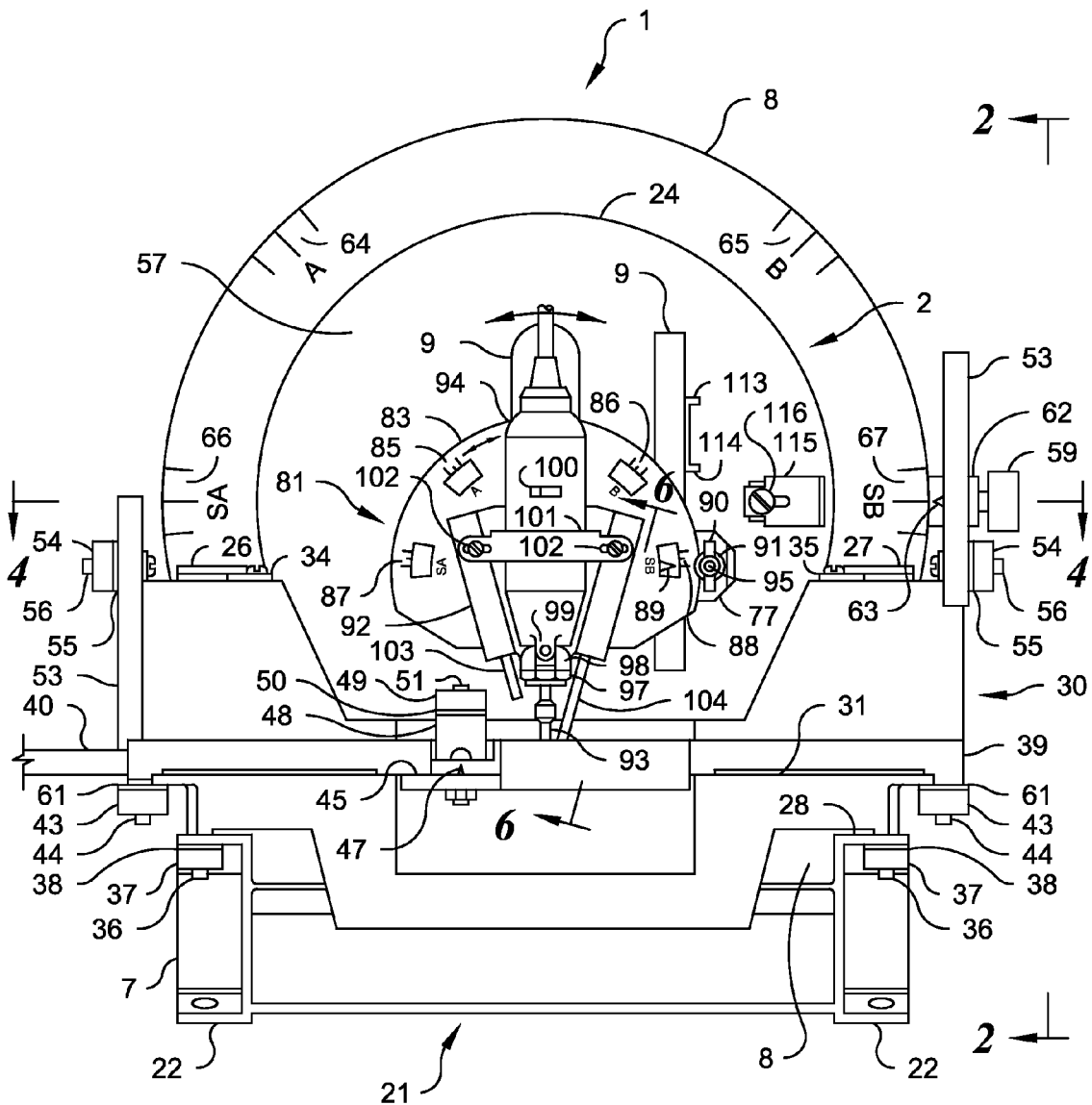
FIG. 1 is a front elevation view of the coping apparatus illustrating a vertical orientation of the rotatable holder slots and cutter assemblies in accordance with an embodiment of the invention.
Figure 2:
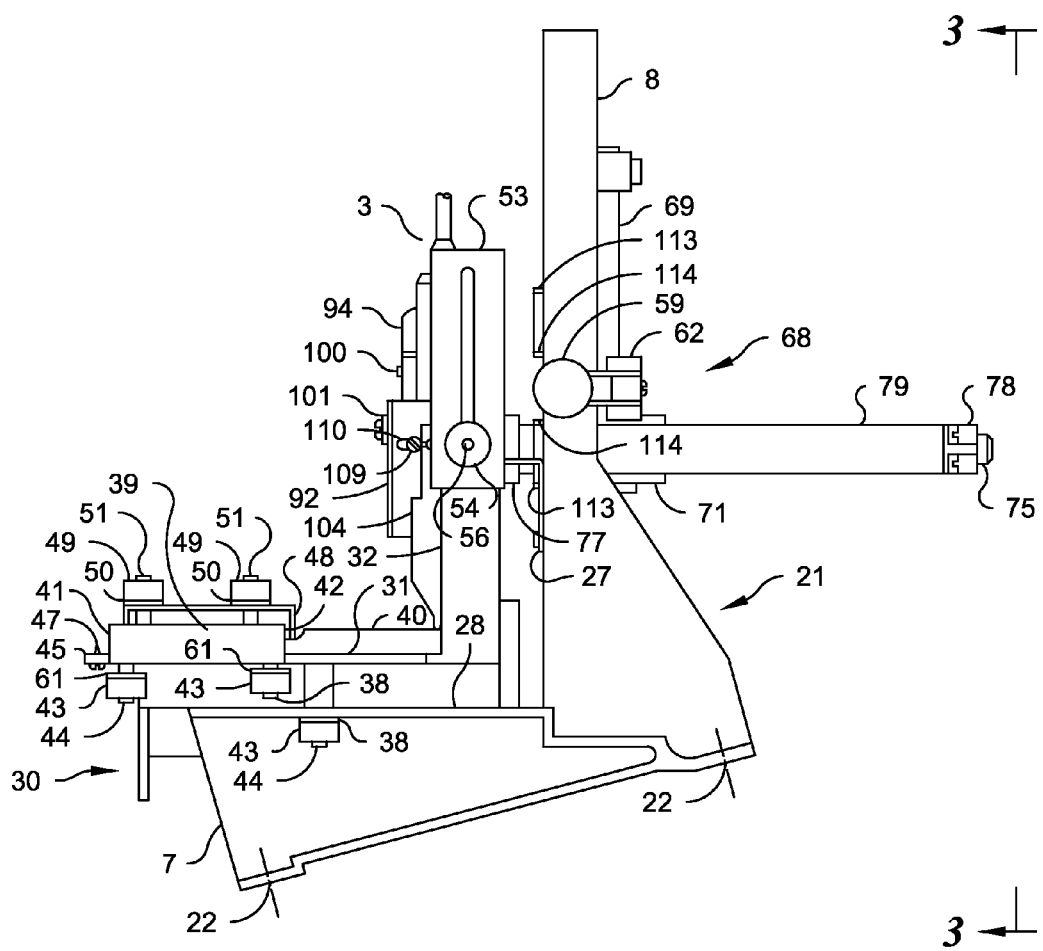
FIG. 2 is a right side elevation view of the coping apparatus in FIG. 1.
Figure 3:
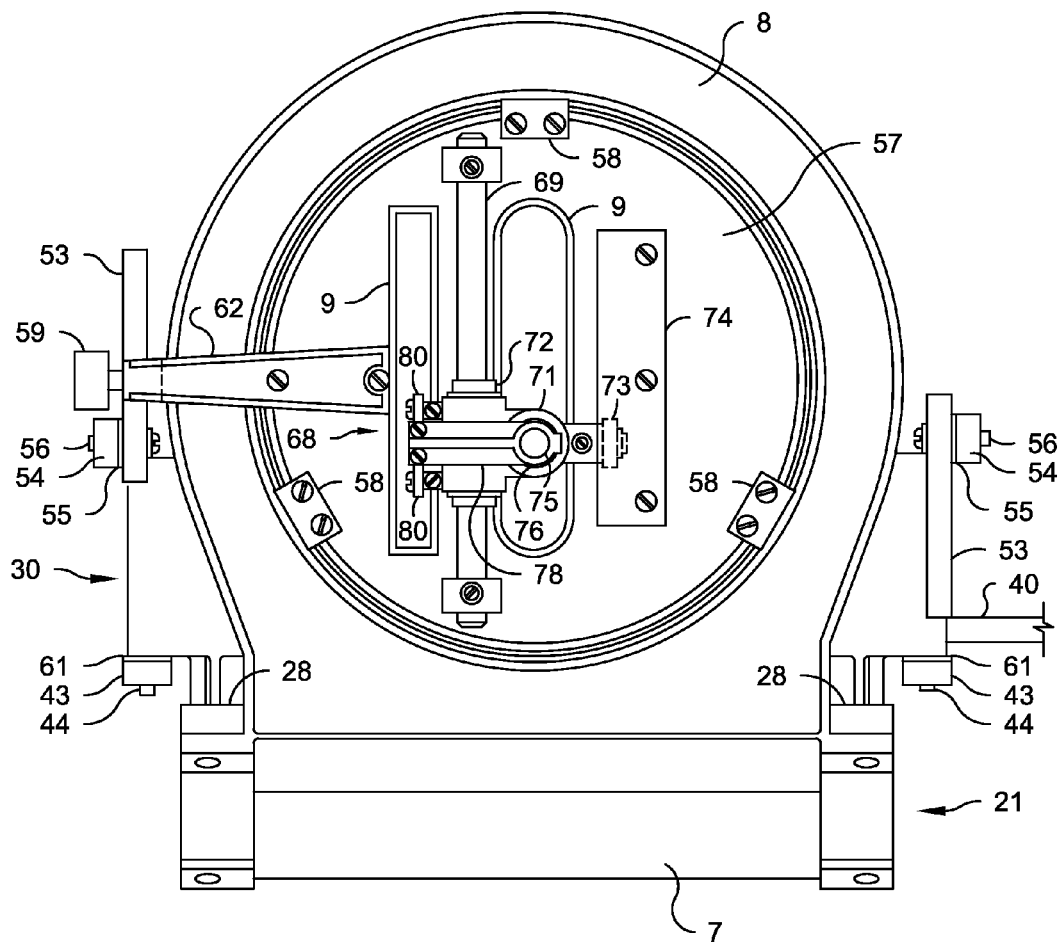
FIG. 3 is a back elevation view of the coping apparatus in FIG. 1 illustrating features of the rotatable holder and two-axis positioning system in accordance with an embodiment of the invention.

Reference will now be made in detail to several preferred embodiments of the invention that are illustrated in the accompanying drawings. Wherever possible, same or similar reference numerals are used in the drawings and the description to refer to the same or like parts or steps. The drawings are not to precise scale.

Referring now to FIG. 1, the coping apparatus 1 includes a rotatable holder assembly 2, a rotatable cutter assembly 81, a rotatable platform 30, and a base 21. The rotatable holder assembly 2 includes a two-axis positioning system 68 and is rotatable in a lockable fashion about an axis perpendicular to the plane of the rotatable holder assembly 2. The rotatable cutter assembly 81 is attached to the two-axis positioning system 68 of the rotatable holder assembly 2 which constrains motion of the rotatable cutter assembly 81 along the slot 9 and perpendicular to the plane of the rotatable holder assembly 2. The rotatable holder assembly 2 and rotatable cutter assembly 81 are disposed in a substantially perpendicular arrangement with respect to the rotatable platform 30. The rotatable platform 30 is movable about a pivot pin 25 so as to rotate or swivel about a vertical axis substantially parallel to the rotatable holder assembly 2 and rotatable cutter assembly 81. The rotatable holder assembly 2 and rotatable platform 30 are attached to and supported by the base 21. In preferred embodiments, the base 21 should support the rotatable holder assembly 2, rotatable cutter assembly 81, and rotatable platform 30 so that they are oriented at an angle with respect to the vertical. The rotatable holder assembly 2, rotatable cutter assembly 81, rotatable platform 30, and base 21, as well as subcomponents therefore, may be fabricated from metal, reinforced plastic, or other suitable materials. A molding 40, examples including but not limited to crown, chair rail, and baseboard molding, is supportable along the rotatable platform 30.

The following description is provided with specific reference to FIGS. 1-5. The base 21 is comprised of two or more planar-shaped elements which generally define a horizontal element 7 and a vertical element 8 disposed in a substantially L-shaped arrangement. The base 21 could be fabricated from a metal via cast methods or a reinforced plastic via molding or injection methods. The horizontal element 7 includes a mounting surface 22 which allows the coping apparatus 1 to rest securely on a table or the like. The vertical element 8 includes a circular-shaped opening.

The rotatable holder assembly 2 includes a circular-shaped table 57 which resides within the opening of the vertical element 8. A circular guide surface 24, along the vertical element 8, and a circular mounting surface 23, along the table 57, contact so as to center the table 57 within the opening. The circular mounting surface 23 and three or more guide clamps 58, attached to the table 57, limit axial movement of the round table 57. However, the table 57 should rotate freely or rotate in a binding fashion with respect to the vertical element 8. The table 57 should also include one or more slots 9, preferably parallel to the stationary shaft 69. In some embodiments, the planar surface along the vertical element 8 and disposed immediately adjacent to the table 57 could include a first scale 64, a second scale 65, a third scale 66, and a fourth scale 67. The scales 64-67 could include markings or indicia indicating the effective wall-to-wall angle achieved by the cutting device 94 for left and right inside corner and other cuts.

The rotatable platform 30 includes a horizontal wall 31 and a vertical wall 32 attached to form an L-shaped subassembly structure. An adjustable planar-shaped table clamp 39 is provided at one end of the horizontal wall 31 so as to form a pocket of generally rectangular shape between the table clamp 39, the horizontal wall 31, and the vertical wall 32. The longitudinal axis of the molding 40 is held by the rotatable platform 30 at an angle from −5 to +5 degrees to the plane of the rotatable holder assembly 2. The distance between the table clamp 39 and the vertical wall 32 should be sufficiently wide so as to accommodate a wide variety of molding designs and types. The rotatable platform 30 further includes a surface 10 below and parallel to the plane of the horizontal wall 31. The surface 10 has a pivot hole 33 aligned vertically with the centerline of the rotatable table 57. The pivot hole 33 engages a pivot pin 25 along the base 21 to guide the rotation of the rotatable platform 30. The rotatable platform 30 also includes two surfaces below and parallel to the surface of the horizontal wall 31 which can be clamped to the rotatable platform mounting surface 28 of the horizontal element 7. A pair of indexes 34, 35 could be attached to the vertical wall 32. It is likewise possible to include a first scale 26 and a second scale 27 disposed along separate structures attached to the vertical element 8 and horizontally extending therefrom. The rotatable platform 30 is positioned so as to align the first scale 26 to one index 34 or the second scale 27 to the second index 35. Markings or indicia along the first and second scales 26, 27 would indicate the angular orientation of the vertical wall 32 of the rotatable platform 30 with respect to the travel of the cutting device 94 representing the wall-to-ceiling angle 132 and the wall-to-floor angle 131, as defined in FIGS. 13a, 13b, 14a, and 14b.

A pair of curved-shaped slots 29 is disposed below the horizontal wall 31 along the rotatable platform mounting surface 28 and about and aligned with the pivot pin 25. A pair of threaded studs 36 is attached to the horizontal wall 31 and one such threaded stud 36 projects through each slot 29. Tightening a knob 37 against a washer 38 disposed along each threaded stud 36 clamps the rotatable platform 30 to horizontal element 7.

A table clamp 39 is provided along the horizontal wall 31 and is adjustable to secure a molding 40 against the vertical wall 32. The table clamp 39 could be positioned along the horizontal wall 31 so that a first clamp surface 41 and/or a second clamp surface 42 secures the molding 40 against the vertical wall 32 to prevent movement of the molding 40 as it is cut. The table clamp 39 is secured to the surface of the horizontal wall 31 by tightening at least two threaded knobs 43 and washers 61 on four threaded studs 44 which are rigidly connected to the table clamp 39. Two surfaces of the table clamp 39, referred to as pin surfaces 45, 46, are positioned along the same plane as the surface of the horizontal wall 31 to support the molding 40. Each pin surface 45, 46 includes a pin 47 which extends above the horizontal wall 31 so as to penetrate the molding 40 to prevent its movement along the longitudinal axis of the horizontal wall 31 during a cut. Preferably, the pin 47 should mark a portion of the molding 40 not visible when applied to a wall. A pin clamp 48 forces the molding 40 against the pin surfaces 45, 46 causing the pin 47 to penetrate the molding 40 as a knob 49 and washer 50 are tightened onto each of a pair of threaded studs 51 rigidly attached to the table clamp 39. A pair of pin clamp slots 52 along the pin clamp 48 allows it to be positioned to secure the molding 40 or to be moved away from the vertical wall 32 when inserting or removing molding 40.

Two clamps 53 are provided to further secure the molding 40 against the surface of the horizontal wall 31. Each clamp 53 is manually movable so as to secure the molding 40 against the surface of the horizontal wall 31 and locked by tightening a knob 54 and washer 55 onto a threaded stud 56 rigidly attached to the vertical wall 32.

Figure 4:
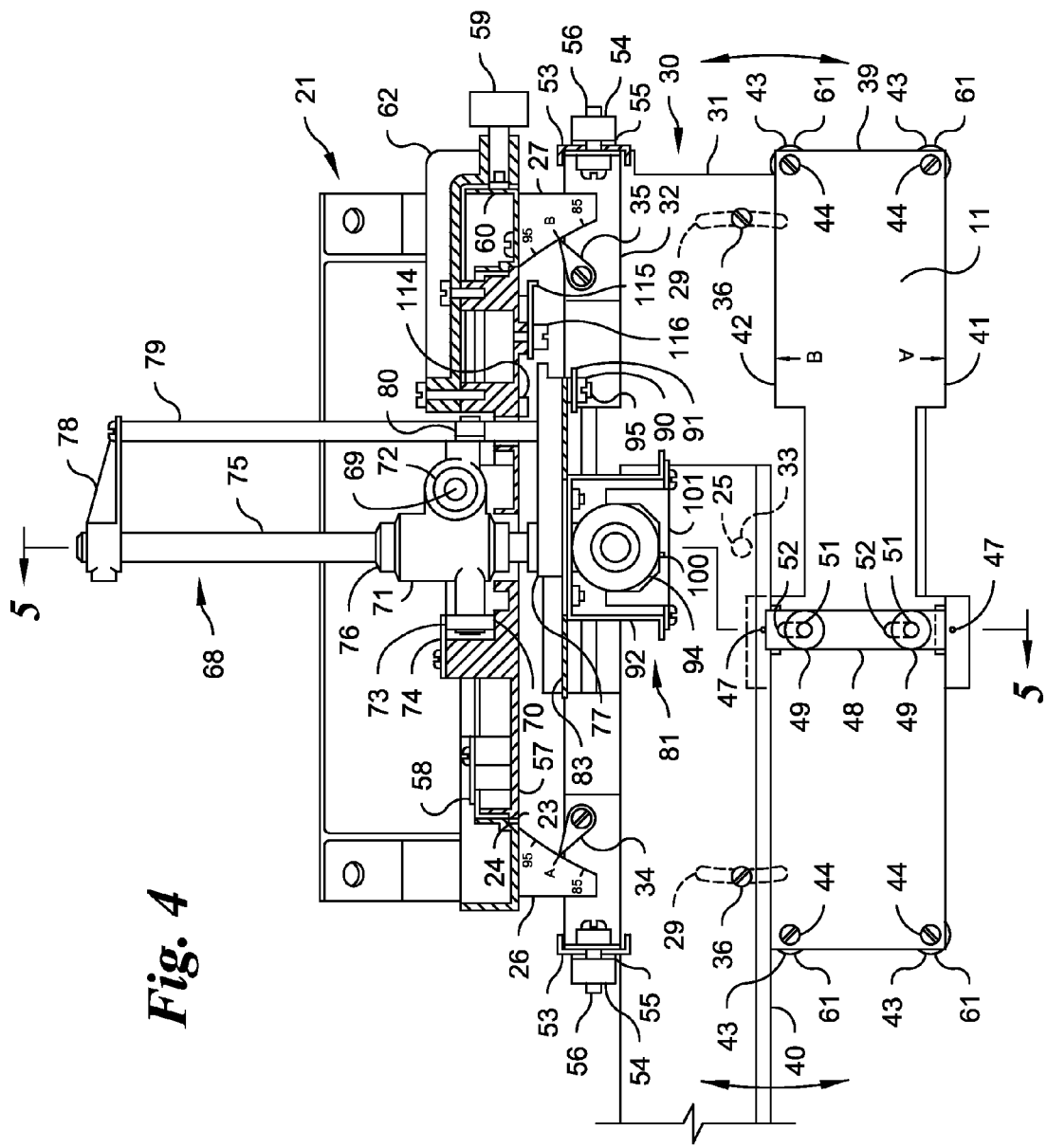
FIG. 4 is a top view of the coping apparatus in FIG. 1 with partial sectional view along view 4-4.
Figure 7:
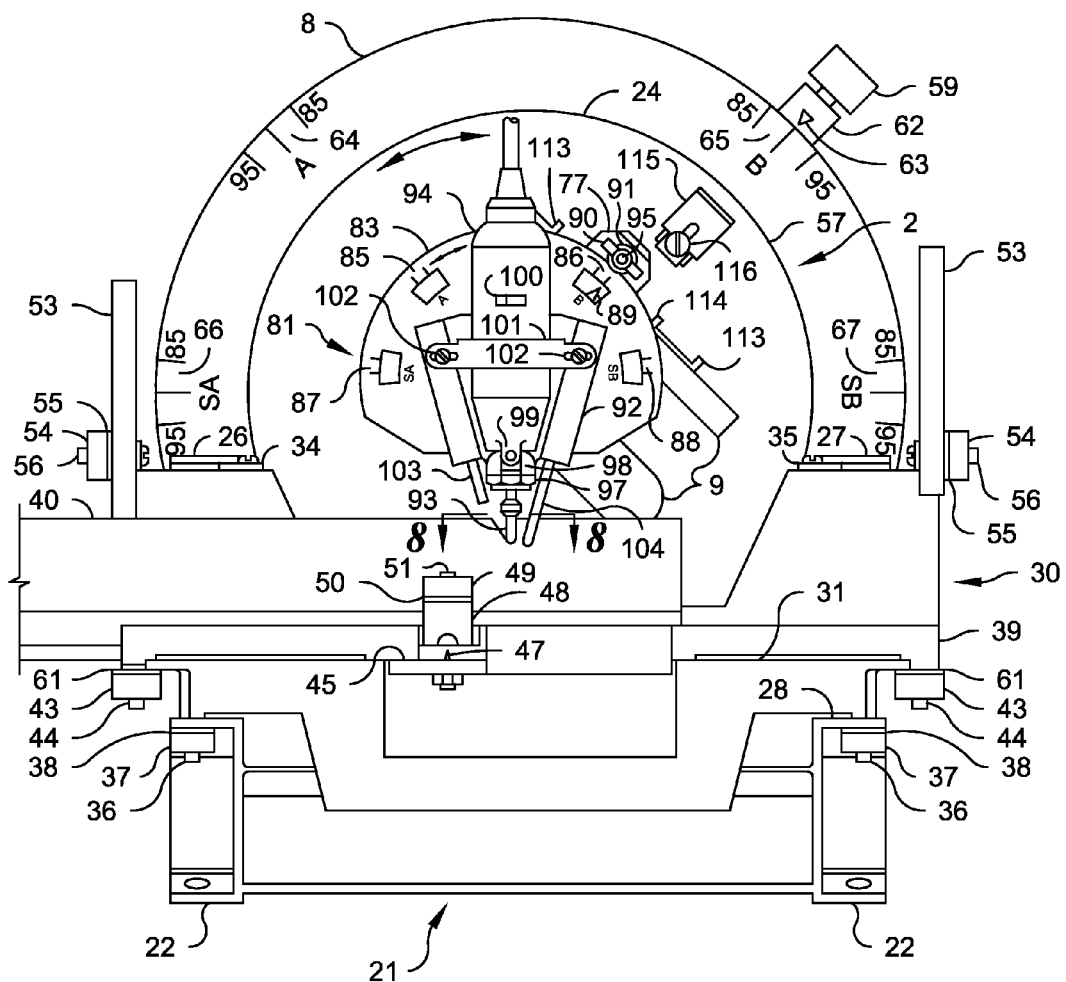
FIG. 7 is a front elevation view of the coping apparatus configured so that the slots along the rotatable holder assembly are at a forty-five degree angle from the horizontal to cut a right coped end on a piece of crown molding in accordance with an embodiment of the invention.
Figure 10:
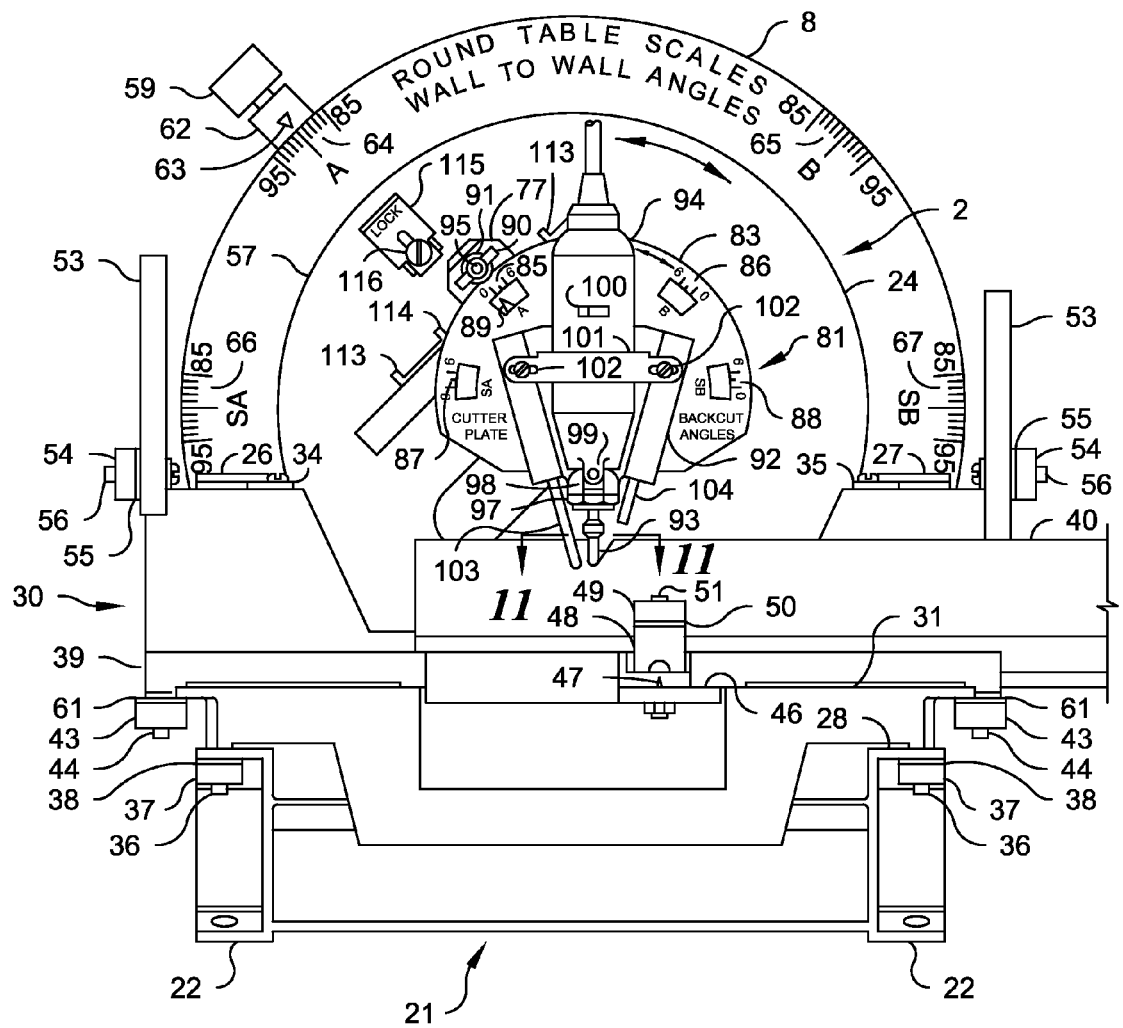
FIG. 10 is a front elevation view of the coping apparatus configured so that the slots along the rotatable holder assembly are at a forty-five degree angle from the horizontal to cut a left coped end on a piece of crown molding in accordance with an embodiment of the invention.

Referring now to FIGS. 4, 7 and 10, a handle 62 could be provided to rotate the table 57 so as to align a table index 63 with the desired angular value displayed on the first scale 64, second scale 65, third scale 66, or fourth scale 67. Scales could be calibrated for angular values from eighty-five to ninety-five degree which are representative of the wall-to-wall angle 130 typical of inside corner cuts, as represented in FIG. 16. The table 57 is secured to the vertical element 8 by tightening a threaded stud 59 against the vertical element 8. A plastic insert 60 could be provided at the end of the threaded stud 59 so as to prevent damage to the vertical wall 8.

Referring again to FIGS. 2-5, a two-axis positioning system 68 is provided including a stationary shaft 69 and a carriage guide 70 parallel to the surface of the table 57. The two-axis positioning system 68 is attached to and a part of the rotatable holder assembly 2. The stationary shaft 69 is attached to the table 57 and the side of the carriage guide 70 is part of the table 57. A carriage 71 is provided so as to ride along the stationary shaft 69 on a linear bearing 72, one example being a 0.625-inch double-sealed bearing, model no. SW10GWUU, sold by Specialty Motions, Inc. Attached to the carriage 71 is a radial bearing 73, one example being a 0.375-inch double-sealed bearing, model no. 1606-2RS, sold by National Precision Bearings, constrained by the carriage guide 70 and bearing guide 74 so as to prevent rotation of the carriage 71 about the stationary shaft 69. A movable shaft 75 moves through the carriage 71 on a linear bearing 76, one example being a 0.625-inch double-sealed bearing, model no. SW10GWUU, sold by Specialty Motions, Inc. The centerline of the movable shaft 75 moves perpendicular to the surface of the table 57. Rigidly attached to the movable shaft 75 are a front arm 77 and a back arm 78. A connector 79 rigidly connects to one end of each of the front and back arms 77, 78. The connector 79 is guided by two radial bearings 80, one example being a 0.250-inch double-sealed bearing, model no. 1606-2RS, sold by National Precision Bearings, on the carriage 71 so as to prevent rotation of the movable shaft 75 in the carriage 71.

Figure 5:
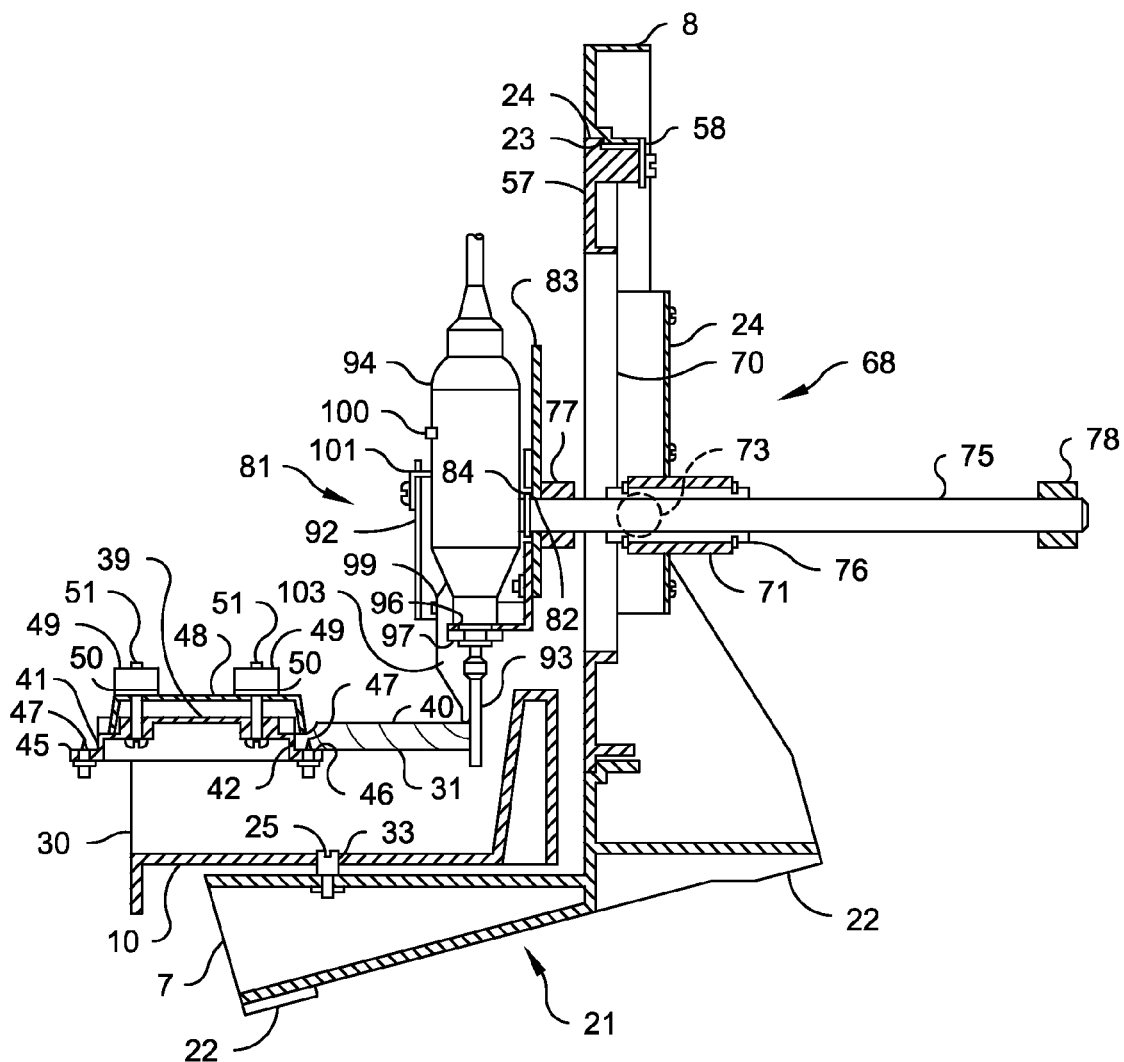
FIG. 5 is a right side sectional elevation view of the coping apparatus with staggered partial sectional view along view 5-5 in FIG. 4.

Referring again to FIGS. 1-5, the rotatable cutter assembly 81 is attached to the movable shaft 75 of the two-axis positioning system 68. A bearing hole 82 along a plate 83 engages the movable shaft 75. The front arm 77 and a retaining ring 84, one example being a 0.625-inch diameter retaining ring, model no. 3100-62-ST-ZD, sold by Industrial Retaining Rings, prevent axial movement of the plate 83 along the movable shaft 75, as represented in FIG. 5. The plate 83 could be rotated around the movable shaft 75 so that the desired backcut angle 129, see FIG. 16, is visually indicated by an index 89, attached to, inscribed, or otherwise marked on the front arm 77, as it aligns with a first scale 85, second scale 86, third scale 87, or fourth scale 88 along the plate 83. A threaded knob 90 and washer 91 arrangement are tightened onto a threaded stud 95 which is rigidly attached to the front arm 77 so as to secure the plate 83 to the front arm 77. A cutter holder 92 forms a pocket-like structure within which a cutting device 94 is secured is rigidly attached to the plate 83 so that the cutting device 94 is oriented in a vertical position. The cutter 93 could be a commercially available spiral cutter, one example being a 0.125-inch diameter Sabercut Zip Bits, model no. SC20, sold by Rotozip, rotated by a commercially available rotary tool, one example being a single or dual speed power tool, model nos. MultiPro 275 or MultiPro 285, sold by Dremel. The cutting device 94 could also be an electric or pneumatic die grinder, a water jet cutter, a laser, or a power tool. The cutting device 94 could be secured to the cutter holder 92 by inserting the threaded mounting shoulder of a Dremel-like device into a mounting hole 96 in the cutter holder 92 and thereafter locking the device with a nut 97. A notch 98 in the cutter holder 92 could engage a protrusion 99 along the tool to prevent rotation around its longitudinal axis and to securely orient the switch 100 towards the operator. A tool clamp 101 could secure the tool in the cutter holder 92. Two or more slotted holes 102 along the tool clamp 101 could allow adjustment of the angle of the centerline of the cutter 93 to the longitudinal surface of the horizontal wall 31.

Figure 6:
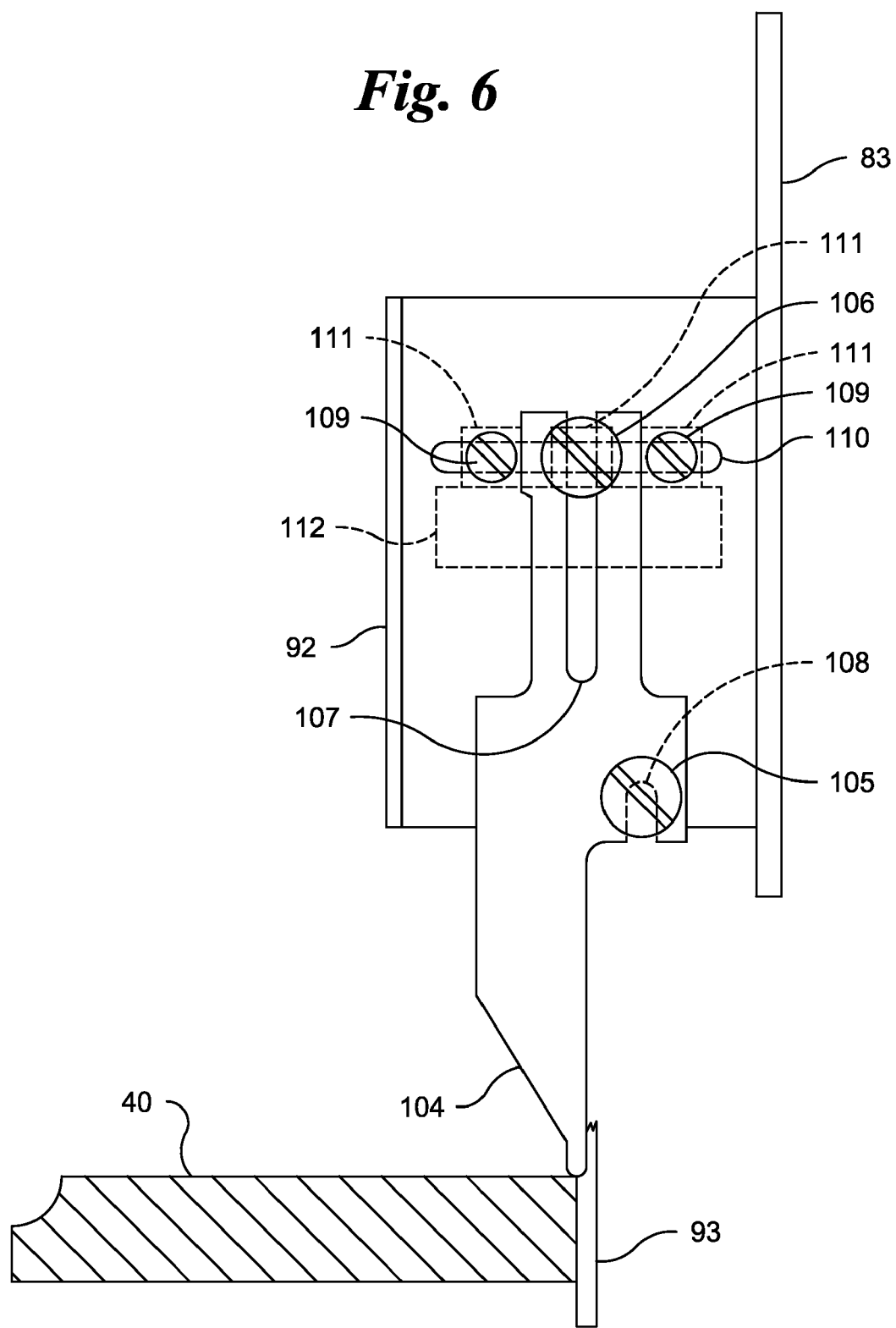
FIG. 6 is a partial view of the coping apparatus along view 6-6 in FIG. 1.

Referring now to FIG. 6, the cutter holder 92 includes a left stylus 103 and a right stylus 104 which extend from the plate 83. The left and right styluses 103, 104 are fastened to the cutter holder 92 by a lower thumbscrew 105 and an upper thumbscrew 106, as represented in FIG. 6. Each stylus 103, 104 could be locked in a raised position when the edge of a vertically disposed upper slot 107 contacts the upper thumbscrew 106 and likewise locked in a lowered position when the edge of a vertically disposed lower slot 108 contacts the lower thumbscrew 105. A pair of adjustable stop screws 109 and an upper thumbscrew 106 pass through one or more horizontally-disposed slots 110 in the cutter holder 92 and into square nuts 111 on the opposite side of the cutter holder 92. A plate 112 attached along the opposite side of the cutter holder 92 prevents rotation of the square nuts 111 when the stop screws 109 are tightened. The stop screws 109 enable adjustment to the position of the tip of each stylus 103, 104 with respect to the centerline of the cutter 93, as represented in FIG. 6, and allow each stylus 103, 104 to be returned to its correct extended position from its raised or retracted position. It is preferred that at least one stylus 103, 104 contacts the upper surface of the molding 40 so as to properly trace the profile thereof during a coping cut. Also, it is preferred for the orientation of the horizontal and vertical elements 7, 8 to have the mounting surface 22 described herein rest on a horizontal plane so that the table 57 leans back at an angle, thereby allowing gravity to keep at least one stylus 103, 104 in contact with the molding 40 during cutting.

Referring again to FIGS. 1 and 2, the rotatable cutter assembly 81 is extendible from the rotatable holder assembly 2 in a perpendicular arrangement and is movable along the stationary shaft 69 of the two-axis positioning system 68. A pair of top detents 113 and a pair of center detents 114 are raised elements from the table 57. When the rotatable cutter assembly 81 is raised to its vertical stop and pushed towards the table 57 until it stops, one of the top detents 113 contacts the side of the front arm 77 and holds it at the vertical stop position, thus allowing the molding 40 to be inserted and removed from the rotatable platform 30.

The center detents 114 are spaced so that the front arm 77 just fits between them. When the cutter assembly 81 is pushed towards the table 57 until it stops with the front arm 77 between the center detents 114, it allows rotation of the table 57. When storing or transporting the coping apparatus 1, the cutter assembly 81 may be locked between the center detents 114 by pushing a center detent lock 115, comprising a plate with a slot, to cover the front arm 77 and tightening a thumbscrew 116 which passes through the slot.

The coping apparatus 1 facilitates coped cuts through a molding 40 via a cutting device 94 guided by either the left stylus 103 or the right stylus 104, as the rotatable cutting assembly 3 is manually moved across the profile of the molding 40 with the stylus 103 or 104 held against the molding 40. In preferred embodiments, the left or right stylus 103, 104 contacting the molding 40 is selected so that the portion of the molding 40 marked by the stylus 103, 104 is cut off and discarded.

Figure 13A:
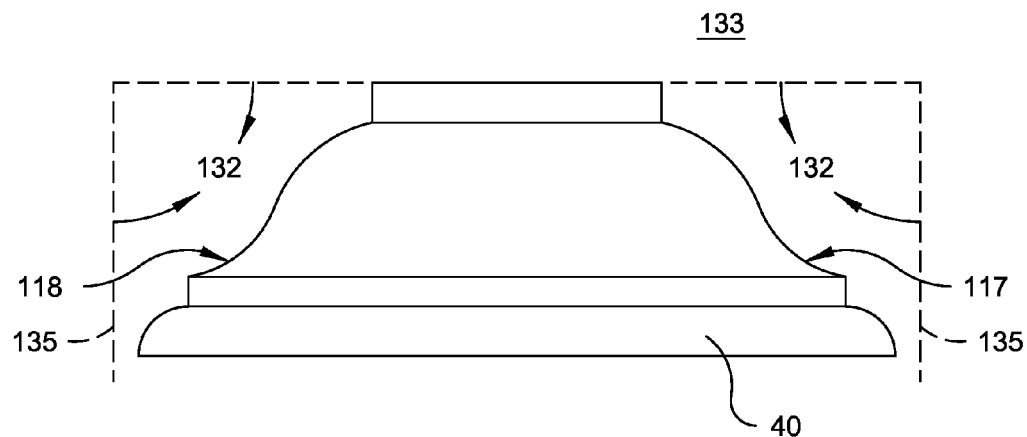
FIG. 13a is a side elevation view of an exemplary crown molding illustrating coped cuts with specific reference to the wall-to-ceiling angle.
Figure 13B:
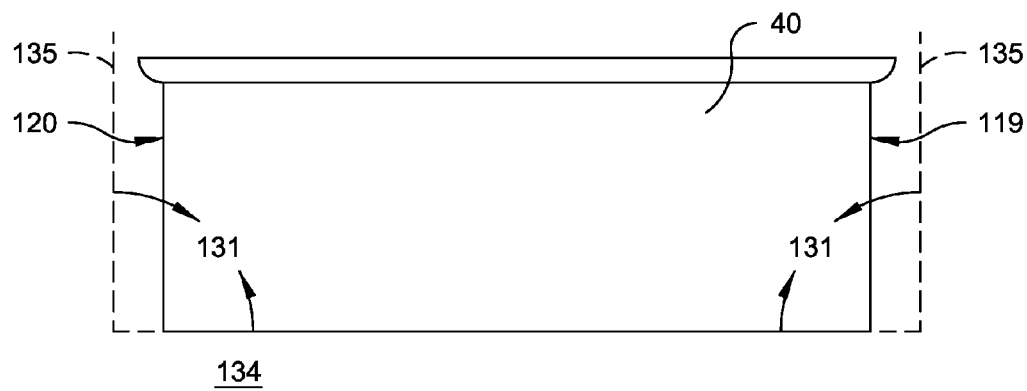
FIG. 13b is a side elevation view of an exemplary baseboard molding illustrating coped cuts with specific reference to the wall-to-floor angle.
Figure 14A:
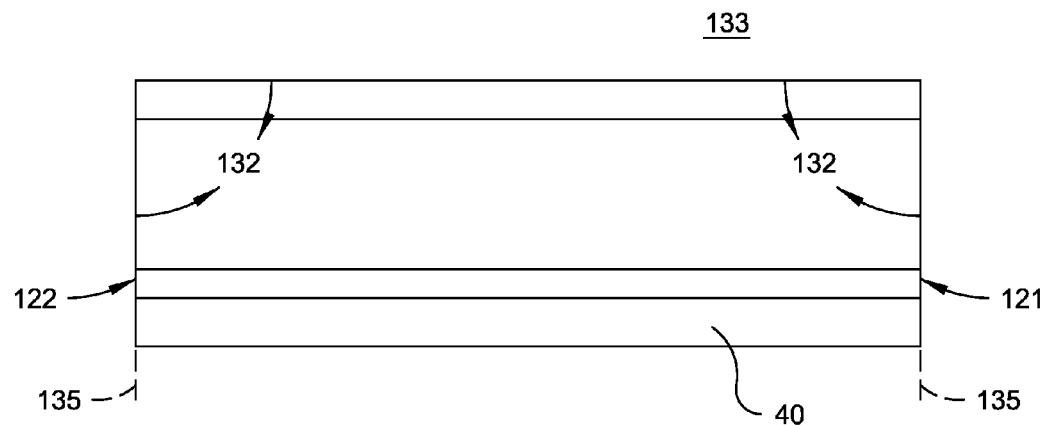
FIG. 14a is a side elevation view of an exemplary crown molding illustrating straight cuts with specific reference to the wall-to-ceiling angle.
Figure 14B:
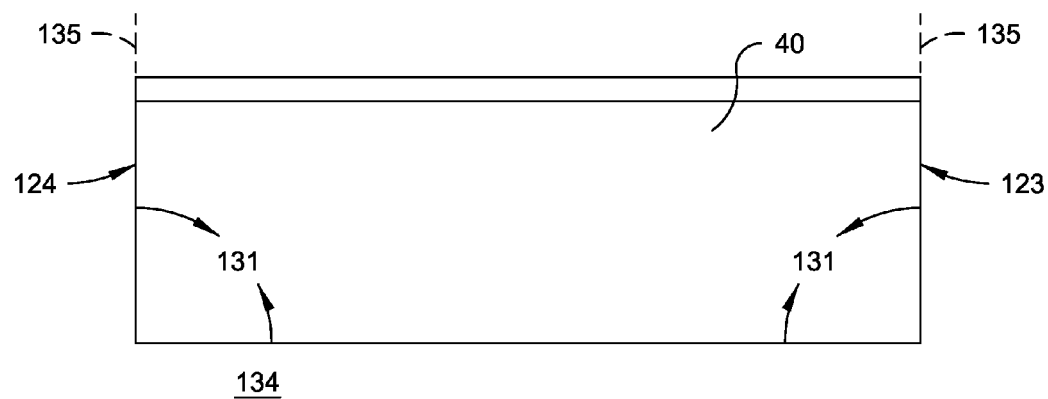
FIG. 14b is a side elevation view of an exemplary baseboard molding illustrating straight cuts with specific reference to the wall-to-floor angle.
Figure 15A:
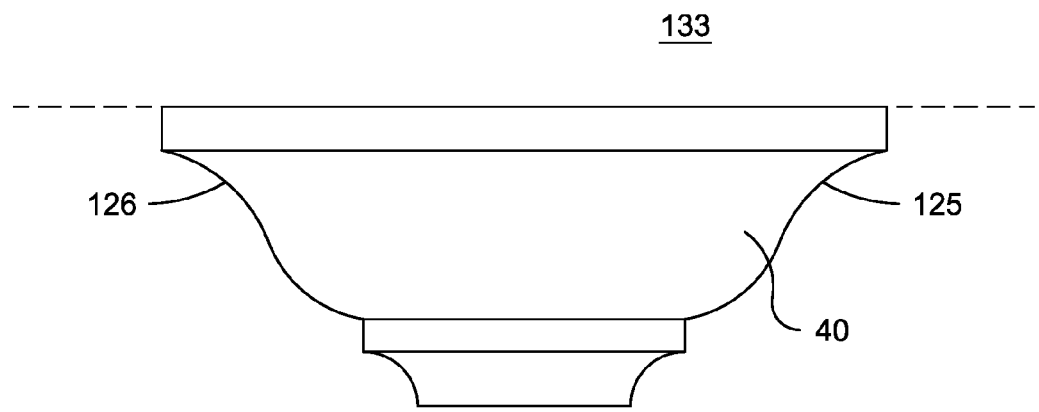
FIG. 15a is a side elevation view of an exemplary crown molding illustrating molded end cuts.
Figure 15B:
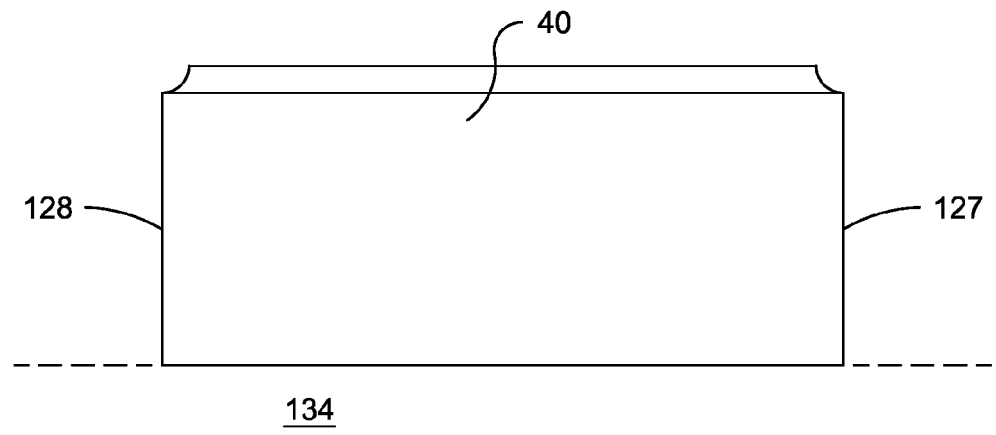
FIG. 15b is a side elevation view of an exemplary baseboard molding illustrating molded end cuts.

The coping apparatus 1 may be used to achieve a variety of cuts with specific reference to the wall-to-wall angle 130, wall-to-floor angle 131, and wall-to-ceiling angle 132. Referring now to FIGS. 13a and 13b, the coping apparatus 1 could be used for a right coped ceiling cut 117, a left coped ceiling cut 118, a right coped floor cut 119, and a left coped floor cut 120 which complement the profile of the molding 40. Referring now to FIGS. 14a and 14b, the coping apparatus 1 could be used for a right straight ceiling cut 121, a left straight ceiling cut 122, a right straight floor cut 123, and a left straight floor cut 124. Referring now to FIGS. 15a and 15b, the coping apparatus 1 could be used for a right molded edge ceiling cut 125, a left molded edge ceiling cut 126, a right molded edge floor cut 127, and a left molded edge floor cut 128 that match the profile of the molding 40. The molding 40 is positioned against a ceiling 133 in FIGS. 13a, 14a, and 15a and against a floor 134 in FIGS. 13b, 14b, and 15b.

Referring again to FIG. 16, all cuts could include an adjustable backcut angle 129, typically from zero to six degrees, but not limited thereto, to remove material behind the visible part of the joint to assure a tight fit between the molding 40 and surface of a wall 135 or a mating molding at the visible portion of the joint. Adjustments are provided on the device for the wall-to-wall angle 130, wall-to-floor angle 131, and wall-to-ceiling angle 132 which typically range from eighty-five to ninety-five degrees, but not limited thereto, to better match the actual angles between the surfaces onto which the moldings 40 are attached.

Reference will now be made again to FIGS. 1-12 and 16 to describe functional aspects of the coping apparatus 1. FIG. 17 includes a chart with specific reference to the reference numerals associated with the various cut types described herein.

Referring again to FIGS. 1-6, the coping apparatus 1 is shown in a first example configured to cut a left straight floor cut 124 on a molding 40 mounted along a floor where the wall-to-floor angle 131 is ninety degrees, the wall-to-wall angle 130 is ninety degrees, and the backcut angle 129 is zero degrees. With further reference to the chart in FIG. 17, this cut requires settings for a left straight floor cut 124.

The ninety degree wall-to-floor angle 131 is obtained by locking the rotatable platform 30 with two knobs 37 so that the ninety degree angle of the second scale 27 is aligned with the index 35. This arrangement positions the longitudinal surface of the vertical wall 32 at a ninety degree angle with respect to the travel path of the movable shaft 75.

The rotatable holder assembly 2 is rotated to obtain a ninety degree setting for the wall-to-wall angle 130, so that the table index 63 aligns with the ninety degree setting on the fourth scale 67 and is locked by the threaded stud 59 to position the stationary shaft 69 at a ninety degree angle with respect to the longitudinal axis of the horizontal wall 31.

A zero degree backcut angle 129 is obtained by rotating the rotatable cutter assembly 81 so the zero degree backcut angle 129 along the fourth scale 88 aligns with the index 89 and is locked in place by tightening the threaded knob 90 placing the centerline of the cutter 93 or the like perpendicular to the plane of the horizontal wall 31. The right stylus 104 is locked in a lowered position and the left stylus 103 in a raised position by tightening the appropriate lower thumbscrews 105 and upper thumbscrews 106.

The molding 40 portion mounted against the wall contacts the horizontal wall 31 and the portion mounted against the floor contacts the vertical wall 32 with the uncut portion of molding 40 extending to the left. The table clamp 39 is positioned so that the table clamp surface 42 pushes the molding 40 against the vertical wall 32 and locked in place via the threaded knobs 43 closest to the vertical wall 32. The pin clamp 48 is placed over the molding 40 and the knobs 49 are tightened so as to push the molding 40 onto the pin 47 and against the pin surface 46. The left clamp 53 is positioned to push the molding 40 against the horizontal wall 31 and locked by tightening the knob 54.

The rotatable cutter assembly 81 is manually positioned so that the right stylus 104 rests on top of the molding 40 with the cutter 93 behind the molding 40. The cutting device 94 could be activated by placing the switch 100 to the ON position. Thereafter, the cutting device 94 and right stylus 104 are manually moved away from the vertical wall 32 while holding the right stylus 104 firmly against the top surface of the molding 40. The cutter 93 is guided by the right stylus 104 and cuts the molding 40 on a path parallel to the path traced by the right stylus 104. The paths of the right stylus 104 and cutter 93 are constrained by the two-axis positioning system 68 described herein. Movement of the right stylus 104 away the vertical wall 32 is constrained by the movable shaft 75 so as to travel perpendicular to the vertical wall 32. Movement of the right stylus 104 towards the horizontal wall 31 is constrained by the stationary shaft 69 so as to move perpendicular to the horizontal wall 31 so that the resulting cut is a left straight floor cut 124. Because the coping apparatus 1 is symmetrical designed and disposed, the described principles apply to other straight cuts.

Referring again to FIG. 7, the coping apparatus 1 in a second example is shown configured to cut a right coped ceiling cut 117 through a crown molding 40 to be mounted with its bottom edge approximately three and one-half inches from a ceiling. In this example, the wall-to-ceiling angle 132 is ninety degrees, the backcut angle 129 is zero degrees, and the wall-to-wall angle 130 is ninety degrees. With further reference to the chart in FIG. 17, this cut requires settings for a right coped ceiling cut 117.

The ninety degree wall-to-ceiling angle 132 is achieved by aligning the ninety degree setting along the second scale 27 with the index 35 and locking it in place with the knobs 37. This arrangement places the longitudinal surface of the vertical wall 32 at a ninety degree angle with respect to the travel of the movable shaft 75.

The wall-to-wall angle 130 of ninety degrees is achieved by aligning the table index 63 with the ninety degree setting on the second scale 65 and locking it in place with the threaded stud 59. This arrangement places the stationary shaft 69 and slots 9 at a forty-five degree angle with respect to the horizontal wall 31, as represented in FIG. 7.

The backcut angle 129 of zero degrees is achieved by aligning the zero degree angle of the second scale 86 to the index 89 and locking it in place with the threaded knob 90. This arrangement places the cutter 93 or the like at a ninety degree angle to the longitudinal axis of the horizontal wall 31. The right stylus 104 is locked in the lowered position and the left stylus 103 in the raised position via the lower and upper thumbscrews 105, 106.

Figure 9:
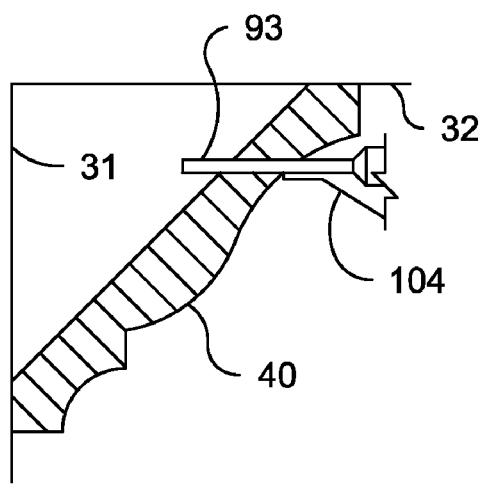
FIG. 9 is a partial section view along view 9-9 in FIG. 8 illustrating orientation of the stylus and cutter in accordance with an embodiment of the invention.

The molding 40 is mounted onto the coping apparatus 1 as it would when mounted three and one-half inches from a ceiling by placing the table clamp 39 onto the horizontal wall 31 with the second clamp surface 42 approximately three and one-half inches from the vertical wall 32 and locking it in place via the two threaded knobs 43 closest to the vertical wall 32. The molding 40 is positioned so that the portion thereof to be mounted onto a wall is against the horizontal wall 31 and the portion thereof to be mounted onto a ceiling is against the vertical wall 32, as represented in FIG. 9, with the uncut portion of molding 40 extending to the left. The pin clamp 48 is positioned over the molding and tightened via the knobs 49 to push the molding 40 into the pin 47 and against the pin surface 46. The left clamp 53 pushes the molding against the horizontal wall 31 and is locked in place with the knob 54.

Figure 8:
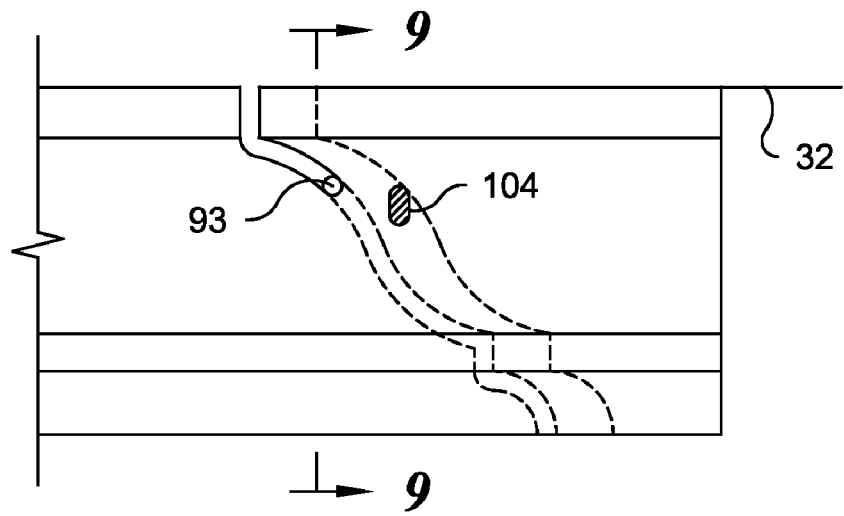
FIG. 8 is a partial section view along view 8-8 in FIG. 7 illustrating the path traced by the stylus and cut path of the cutter in accordance with an embodiment of the invention.

The cutter assembly 81 is manually moved so that the right stylus 104 is against the top of the molding 40 at the plane of the vertical wall 32 with the cutter 93 behind the molding 40. The cutting device 94 could be powered as the switch 100 is placed in the ON position. Thereafter, the right stylus 104 is manually moved away from the vertical wall 32 while held in firm contact with the top surface of the molding 40 causing the cutter 93 to cut the molding 40 along a path parallel to the path of the right stylus 104, but at an offset as illustrated in FIG. 8. As the right stylus 104 is moved along the surface of the molding 40, its movement is constrained by the two-axis positioning system 68. For example, movement of the right stylus 104 along the surface of the molding 40, which is parallel to the horizontal wall 31 and perpendicular to the table 57, requires movement of the movable shaft 75 only. As the right stylus 104 follows the curved surface of the molding 40 downward towards the horizontal wall 31 and away from the table 57, it requires movement of the movable shaft 75 and movement of the carriage 71 along the stationary shaft 69. In this example, the path of the right stylus 104 towards the horizontal wall 31 must follow the forty-five degree angle of the stationary shaft 69 causing movement of the right stylus 104 to the right. The distance over which the stylus 104 moves to the right is equal to the distance it moves down towards the horizontal wall 31 divided by the tangent of the angle of the stationary shaft 69 to the horizontal wall 31, which is forty-five degrees in the present example. For a forty-five degree angle, the tangent is one so the distances over which the right stylus 104 moves to the right and down are the same. The shape of the resulting cut complements the profile of the molding 40, thereby facilitating a right coped ceiling cut 117.

Referring again to FIG. 10, the coping apparatus 1 in a third example is shown configured to cut a left coped ceiling cut 118 through a crown molding 40 to be mounted with the bottom edge of the molding 40 three and one-half inches from a ceiling. The wall-to-ceiling angle 132 is ninety degrees, the backcut angle 129 is zero degrees, and the wall-to-wall 130 angle is ninety degrees. With reference to the chart in FIG. 17, this cut requires settings for a left coped ceiling cut 18.

The ninety degree wall-to-ceiling angle 132 is obtained by aligning the ninety degree setting of the first scale 26 with the index 34 and locking it in place with the knobs 37. This arrangement places the longitudinal surface of the vertical wall 32 at a ninety degree angle with respect to the travel path of the movable shaft 75.

The wall-to-wall angle 130 of ninety degrees is provided by aligning the table index 63 with the ninety degree setting of the first scale 64 and locking it in place with the threaded stud 59. This arrangement places the stationary shaft 69 and slots 9 at a forty-five degree angle with respect to the horizontal wall 31, as represented in FIG. 10.

The backcut angle 129 of zero degrees is obtained by aligning the zero degree angle of first scale 85 to the index 89 and locking it in place with the threaded knob 90. This arrangement places the cutter 93 or the like at a ninety degree angle with respect to the longitudinal axis of the horizontal wall 31. The left stylus 103 is locked in the lowered position and the right stylus 104 in the raised position via the lower and upper thumbscrews 105, 106.

Figure 12:
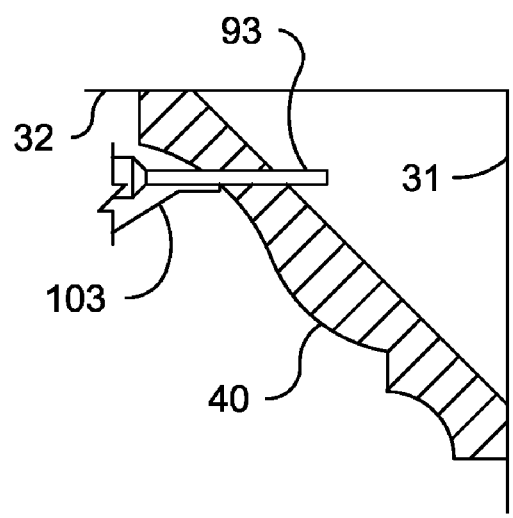
FIG. 12 is a partial section view along view 12-12 in FIG. 11 illustrating the orientation of the stylus and cutter in accordance with an embodiment of the invention.

The molding 40 is mounted in the coping apparatus 1 as it would be when mounted three and one-half inches from a ceiling by placing the table clamp 39 on the horizontal wall 31 with the first clamp surface 41 a distance of three and one-half inches from the vertical wall 32 and locking it in place with the two threaded knobs 43 closest to the vertical wall 32. The molding 40 is positioned with the portion thereof to be mounted onto a wall against the horizontal wall 31 and the portion thereof to be mounted onto a ceiling against the vertical wall 32, as represented in FIG. 12, with the uncut portion of molding 40 extending to the right. The pin clamp 48 is positioned over the molding 40 and tightened via the knobs 49 to push the molding 40 onto the pin 47 and against the pin surface 45. The right clamp 53 pushes the molding 40 against the horizontal wall 31 and is locked in place with the knob 54.

Figure 11:
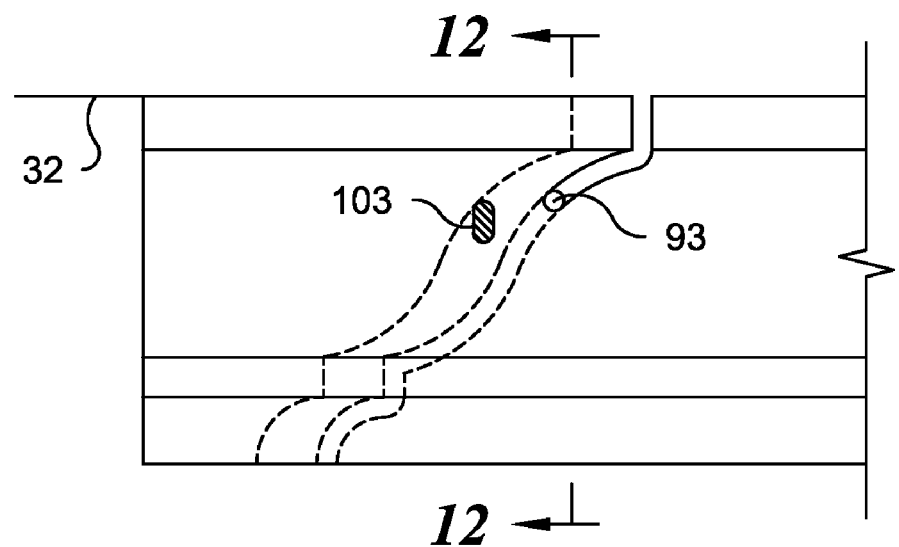
FIG. 11 is a partial section view along view 11-11 in FIG. 10 illustrating the path traced by the stylus and cut path of the cutter in accordance with an embodiment of the invention.

The rotatable cutter assembly 81 is manually moved so that the left stylus 103 is placed against the top of the molding 40 at the plane of the vertical wall 32 with the cutter 93 behind the molding 40. The cutting device 94 is powered by placing the switch 100 to the ON position. Thereafter, the left stylus 103 is manually moved away from the vertical wall 32 while held in firm contact with the molding 40 surface causing the cutter 93 to cut the molding 40 along a path parallel to the path of the left stylus 103, but at an offset as illustrated in FIG. 11.

Movement of the left stylus 103 along the surface of the molding 40 is constrained by the two-axis positioning system 68. Movement of the left stylus 103 along the surface of the molding 40 which is parallel to the horizontal wall 31 and perpendicular to the table 57 requires movement of the movable shaft 75 only. As the left stylus 103 follows the curved surface of the molding 40 downward towards the horizontal wall 31 and away from the table 57, it requires movement of the movable shaft 75 and movement of the carriage 71 on the stationary shaft 69. In this example, the path of the left stylus 103 towards the horizontal wall 31 must follow the forty-five degree angle of the stationary shaft 69 causing the left stylus 103 to move to the left. The distance the left stylus 103 moves to the left is the distance it moves down divided by the tangent of the angle of the stationary shaft 69 to the horizontal wall 31, which is forty-five degrees in this example. For a forty-five degree angle, the tangent is one so that the distances the stylus 103 move to the left and down are the same. The shape of the resulting cut compliments the profile of the molding 40, thereby facilitating a left coped ceiling cut 118.

While a variety of wall-to-wall angles 130 are possible, it is preferred for the range of angles to include eighty-five to ninety-five degrees. The desired angle is obtained by aligning the table index 63 with the desired wall-to-wall angle 130 of the first scale 64, second scale 65, third scale 66 or fourth scale 67. This arrangement places the stationary shaft 69 at a forty to fifty degree angle with respect to the longitudinal axis of the horizontal wall 31. When the left or right stylus 103, 104 follows the profile of the molding 40, the distance it and the cutter 93 moves to the right or left is the distance it moves downward divided by the tangent of the angle of the stationary shaft 69 to the longitudinal axis of the horizontal wall 31. For the example shown in FIG. 7, if the wall-to-wall angle 130 is ninety-five degrees, then the table index 63 is aligned with the ninety-five degree setting on the second scale 65. This arrangement places the stationary shaft 69 at a fifty degree angle with respect to the horizontal wall 31. For a fifty degree angle, the tangent is 1.19 so the distance the right stylus 104 moves to the right is the distance it moves downward divided by 1.19. The result is a coped cut corrected for a ninety-five degree wall-to-wall angle 130.

While it is further possible to adjust the backcut angle 129 over a wide variety of values, it is preferred for the range to be from zero to six degrees. The backcut angle 129 is set by aligning the first scale 85, second scale 86, third scale 87, and fourth scale 88 to the index 89 at the desired backcut angle 129. This arrangement places the cutter 93 at the desired backcut angle 129 with respect to the longitudinal axis of the horizontal wall 31.

While it is further possible to adjust the wall-to-floor angle 131 or wall-to-ceiling angle 132 over a variety of angular values, it is preferred for the range to be from eighty-five to ninety-five degrees. The wall-to-floor angle 131 or wall-to-ceiling angle 132 is set by aligning the first scale 26 with the index 34 or the second scale 27 with the index 35 at the desired angle. This arrangement places the vertical wall 32 at the desired angle to the travel path of the movable shaft 75 and cuts the desired wall-to-floor angle 131 or wall-to-ceiling angle 132.

The coping apparatus 1 is described herein with specific reference to commercial electric cutting devices 94. However, it is understood that the cutting device 94 could be any cutting device, including but not limited to an electric or pneumatic die grinder, a motor built integrally into the cutter holder 92, a high pressure fluid (gas or liquid) jet, and a laser cutter.

When the small diameter cutter 93 cuts a coped floor or ceiling cut 117, 118, 119, or 120 on one end of a piece of molding 40 which is the complement of the molding profile, the shape of the end of the molding which is cut off is the same as the molding profile and can be used as a decorative molded edge ceiling or floor cut 125, 126, 127, or 128. The molded edge can therefore be made by the same device by following the settings in FIG. 17.

While specific reference is made throughout the description herein to the rotatable features of the rotatable holder assembly 2, rotatable cutter assembly 81, and rotatable platform 30, it is understood that one of more of these elements could be fixed and non-rotatable. For example, it is possible for an embodiment of the coping apparatus 1 to have the rotatable holder assembly 2, rotatable cutter assembly 81, and rotatable platform 30 fixed and non-rotatable so as to facilitate a coped cut along a single angle, one non-limiting specific example being forty-five degrees.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A coping apparatus facilitating a left or right, straight, or coped cut through a molding with adjustability for a wall-to-ceiling angle, a wall-to-floor angle, a wall-to-wall angle, and/or a backcut angle comprising:

(a) a rotatable holder assembly including a circular-shaped table disposed within a circular-shaped opening along a vertical element of an L-shaped base element, wherein said circular-shaped table and said vertical element are in a coplanar arrangement, said circular-shaped table rotatable within and restrained from axial movement in said circular-shaped opening, said circular-shaped table including at least one opening there through and a two-axis positioning system with a carriage movable along a direction parallel to said circular-shaped table on a guide attached to said circular-shaped table a movable member of said two-axis positioning system passing through said carriage and further passing through said at least one opening in a direction substantially perpendicular to said circular-shaped table, said circular-shaped table lockable to said vertical element so as to allow for adjustment to said left or right, straight, or coped cut and said wall-to-wall angle via adjustment of said guide with respect to a horizontal wall of a rotatable platform on which said molding is supportable;

(b) a rotatable cutter assembly located on a pivot at one end of said movable member, said rotatable cutter assembly rotatable about a pivot axis parallel to said movable member and lockable with respect to said rotatable holder assembly, said at least one stylus attached to and extending from said rotatable cutter assembly, said rotatable cutter assembly capable of holding a cutting device substantially parallel to said rotatable holder assembly adjacent to said at least one stylus so that a cut is substantially perpendicular or at said backcut angle to said horizontal wall, said rotatable cutter assembly being linearly movable along a direction perpendicular to said rotatable holder assembly as permitted by said two-axis positioning system and moveable parallel to said rotatable holder assembly as permitted by an angular orientation of said guide, said rotatable cutter assembly movable so that said at least one stylus traces a profile of said molding and said cutting device cuts said molding along a straight line or a complement of said profile; and (c) said rotatable platform including a horizontal wall and a vertical wall in a perpendicular arrangement, said molding positionable on said horizontal wall next to said vertical wall and securable thereto, said horizontal wall perpendicular to said rotatable holder assembly and said vertical wall substantially parallel to said rotatable holder assembly, said rotatable cutter assembly sufficiently moveable so as to completely cut said molding disposed along said horizontal wall and said vertical wall, said horizontal wall swivels about a pivot pin along a horizontal element of said L-shaped base element for adjustment to said wall-to-floor angle and said wall-to-ceiling angle cut by said cutting device, said rotatable platform lockable to said base element, said rotatable platform including a table clamp adjustably attached to said horizontal wall and at least one stationary pin extending therefrom, said table clamp presses said molding onto said stationary pin to prevent movement of said molding as it is cut, said horizontal element of said L-shaped base element attached to and supporting said rotatable holder assembly and said rotatable platform.

2. The coping apparatus of claim 1 wherein said cutting device includes a spiral cutter.

3. The coping apparatus of claim 1, wherein said cutting device is electrically or pneumatically powered.

4. The coping apparatus of claim 1, wherein said cutting device is a high pressure fluid jet device.

5. The coping apparatus of claim 1, wherein said cutting device is a laser.

6. The coping apparatus of claim 1, wherein said molding is a crown molding, a chair rail, or a baseboard.

7. The coping apparatus of claim 1, wherein said wall-to-wall angle is 85 to 95 degrees.

8. The coping apparatus of claim 1, wherein said wall-to-ceiling angle or said wall-to-floor angle is from 85 to 95 degrees.

9. The coping apparatus of claim 1, wherein said backcut angle is from 0 to 6 degrees.

10. The coping apparatus of claim 1, wherein a longitudinal axis of said molding is held by said rotatable platform at an angle from −5 to +5 degrees to a plane of said rotatable holder assembly.

11. The coping apparatus of claim 1, wherein said stationary pin marks said molding along a surface which is not visible after installation.

12. The coping apparatus of claim 1, wherein one said at least one stylus contacts said molding as said molding is cut.

13. The coping apparatus of claim 12, wherein said at least one stylus includes a left stylus and a right stylus disposed about said cutting device in a symmetric arrangement.

14. The coping apparatus of claim 12, wherein said at least one stylus contacts said molding along that portion which is discarded.

15. The coping apparatus of claim 1, wherein said two-axis positioning system further includes a stationary shaft, a movable shaft, a front arm, a back arm, and a connector, said stationary shaft and said guide attached to said circular-shaped table, said carriage rides along said stationary shaft via a first linear bearing, said carriage attached to a radial bearing constrained by said guide and a bearing guide so as to prevent rotation of said carriage about said stationary shaft, said movable shaft movable through said carriage on a second linear bearing, said movable shaft movable perpendicular said circular-shaped table, said front arm and said back arm rigidly attached to said movable shaft, a connector rigidly connected to one end of each said front arm and said back arms and guided by a pair of radial bearings along said carriage so as to prevent rotation of said movable shaft in said carriage.

16. The coping apparatus of claim 1, wherein at least one of said rotatable holder assembly, said rotatable cutter assembly, or said rotatable platform is fixed and non-rotatable.

\* \* \* \* \*